(12) United States Patent
Jones

(10) Patent No.: US 10,945,097 B1
(45) Date of Patent: Mar. 9, 2021

(54) METHOD OF IMPLEMENTING A LIGHTWEIGHT, ELECTRONIC EAR TAG FOR LOCATION TRACKING AND GEO-FENCING TASKS

(71) Applicant: Andy Doyle Jones, Edmond, OK (US)

(72) Inventor: Andy Doyle Jones, Edmond, OK (US)

(*) Notice: Subject to any disclaimer, the term of this patent is extended or adjusted under 35 U.S.C. 154(b) by 0 days.

(21) Appl. No.: 16/727,736

(22) Filed: Dec. 26, 2019

Related U.S. Application Data

(60) Provisional application No. 62/896,985, filed on Sep. 6, 2019.

(51) Int. Cl.
| | | |
|---|---|---|
| *H04W 4/029* | (2018.01) | |
| *H04W 4/021* | (2018.01) | |
| *G06K 19/07* | (2006.01) | |

(52) U.S. Cl.
CPC ........ *H04W 4/029* (2018.02); *G06K 19/0723* (2013.01); *H04W 4/021* (2013.01)

(58) Field of Classification Search
CPC .... A01K 11/00; A01K 11/001; A01K 11/004; A01K 11/006; A01K 5/02; A01K 29/00; A01K 29/005; A01K 11/008; H04W 4/80; H04W 4/70; H04W 4/24; H04W 4/50; H04W 12/00; H04W 12/1206; H04W 12/12; H04W 52/00; H04W 4/20; H04W 52/02; H04W 88/08; H04W 88/02; H04W 52/0235; H04W 52/0241; H04W 52/0245; H04W 84/18; H04W 52/0261; H04W 88/00; H04W 88/16; H04W 84/20; H04W 76/50; H04W 76/00; H04W 64/00; H04W 52/58; H04W 52/003; H04W 52/06;
(Continued)

(56) References Cited

U.S. PATENT DOCUMENTS

| | | | | |
|---|---|---|---|---|
| 4,854,328 A | * | 8/1989 | Pollack | 128/736 |
| 6,155,208 A | * | 12/2000 | Schell et al. | 119/720 |

(Continued)

FOREIGN PATENT DOCUMENTS

| | | |
|---|---|---|
| CN | 204032048 | 12/2014 |
| CN | 204860518 U | 12/2015 |

OTHER PUBLICATIONS

"Solar GPS Tracker", https://pl.aliexpress.com/item/32907891576.html.

*Primary Examiner* — Meless N Zewdu

(57) ABSTRACT

A method of implementing a lightweight, electronic ear tag allows for location tracking and geo-fencing tasks of a herd animal. A location-tracking device tracks spatial-positioning data of electronic ear tag. A communication node relays the spatial-positioning data to at least one remote server hosting an owner account that allows the owner to interact with the electronic ear tag. Accordingly, the spatial-positioning data is relayed from a low-power transceiver to a low-power gateway, if the electronic ear tag is in communication with the communication node. If the electronic ear tag is not in communication with the communication node, the spatial-positioning data is archived and store locally in the electronic ear tag. A high-power gateway provided at the communication node relays the spatial-positioning data to the remote server. Accordingly, the remote server generates a graphical representation of the spatial-positioning data, which is finally displayed on a personal computing device of the owner.

21 Claims, 18 Drawing Sheets

(58) Field of Classification Search
CPC ............... H04W 16/225; H04W 16/20; H04W
52/0283; H04W 52/0219; H04W 4/029;
H04W 4/021; H04W 4/02; H04W 4/185;
H04W 12/1004; H04W 88/021; H04W
88/04; H04W 92/00; H04W 92/08; H04W
52/0209; H04W 40/00; H04W 40/005;
H04W 40/20; H04W 40/22; G06K 19/07;
G06K 19/0723; G06K 7/10237
See application file for complete search history.

(56) References Cited

U.S. PATENT DOCUMENTS

| | | | |
|---|---|---|---|
| 2002/0010390 A1* | 1/2002 | Guice et al. ................ | 600/300 |
| 2005/0145187 A1 | 7/2005 | Gray | |
| 2008/0312511 A1* | 12/2008 | Osler et al. | |
| 2010/0206245 A1* | 8/2010 | Cross et al. ................ | 119/720 |
| 2011/0030875 A1* | 2/2011 | Conte et al. ................ | 156/64 |
| 2013/0340305 A1 | 12/2013 | Mobley | |
| 2016/0135426 A1* | 5/2016 | Harty et al. ......... | A01K 11/006 |
| 2016/0295363 A1* | 10/2016 | Jelle ...................... | H04W 4/021 |
| 2017/0042119 A1* | 2/2017 | Garrity ............... | A01K 11/008 |
| 2017/0289323 A1* | 10/2017 | Gelvin et al. ............................... | |
| | | | H04L 2012/40273 |
| 2018/0199172 A1* | 7/2018 | Boily et al. ............ | H04W 4/38 |
| 2018/0235184 A1* | 8/2018 | Harty et al. ......... | A01K 29/005 |
| 2018/0286205 A1* | 10/2018 | Batra et al. ........ | G08B 13/2462 |
| 2019/0380311 A1* | 12/2019 | Crouthamel et al. ....................... | |
| | | | A01K 29/005 |
| 2020/0090627 A1* | 3/2020 | Saito et al. ............ | G09G 5/377 |

* cited by examiner

METHOD OF IMPLEMENTING A LIGHTWEIGHT, ELECTRONIC EAR TAG FOR LOCATION TRACKING AND GEO-FENCING TASKS

The current application claims a priority to the U.S. Provisional Patent application Ser. No. 62/896,985 filed on Sep. 6, 2019.

FIELD OF THE INVENTION

The present invention generally relates to a method of implementing a lightweight, electronic ear tag for location tracking and geo-fencing tasks. More specifically, the present invention utilizes a low-power, low-cost network to relay location and sensing data to a central server via at least one communication node.

BACKGROUND OF THE INVENTION

Electronic ear tags are used to identify and track livestock and have quickly started replacing branding as the most popular form of visual identification. Primarily, electronic ear tags are used for electronic identification for tracking animal location, performance, and overall health. This can save time and money labor costs required to track and monitor the livestock. The electronic ear tags also allow for set up of perimeters, alerts, and theft prevention features. However, current ear tags in the market rely on expensive cellular networks to transfer data to and from a central server. Further, these mobile-based ear tags are usually very heavy and can cause damage to the animal's ear. Thus, a cheaper and more light-weight design is required.

The present invention is the method of implementing an electronic ear tag which facilitates the placement of a location-tracking transceiver to provide accurate, real-time, spatial coordinates of the animal. The ear monitors the position of the animal via a satellite navigation system and relays the data via a built-in Ultra-High Frequency (UHF) LoRa-WAN radio system to any nearby LoRa-WAN gateway for storage and processing to a remote server. The data is used to generate a graphical representation of the animal's location, as well as to constrain the location of the animal via geo-fencing functionality. The present invention is powered by a solar cell mounted onto the housing. The solar cell provides reliable source of energy and enables a lightweight, durable design.

DETAILED DESCRIPTION OF THE INVENTION

All illustrations of the drawings are for the purpose of describing selected versions of the present invention and are not intended to limit the scope of the present invention.

Figure 1:
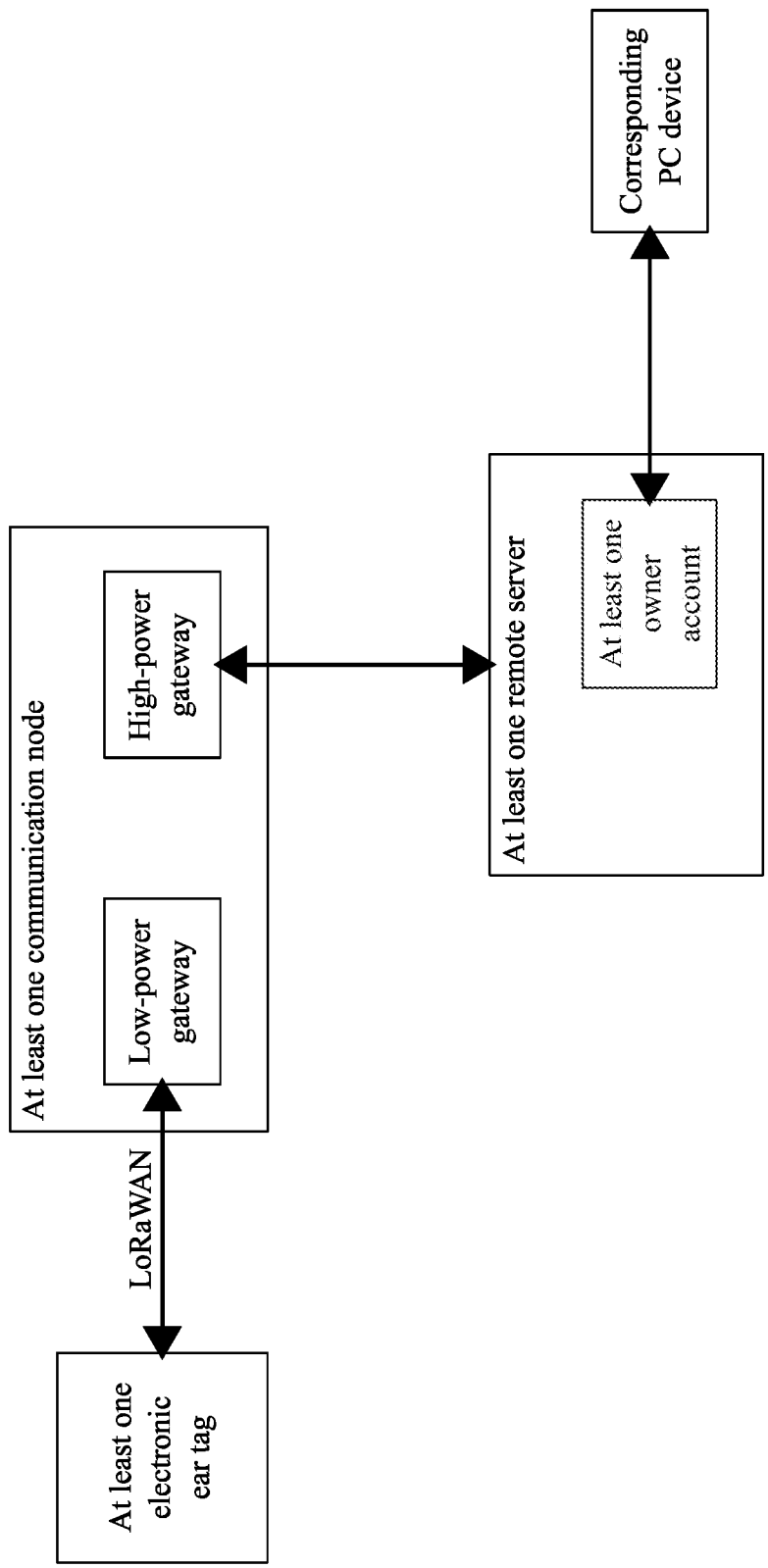
FIG. 1 is a block diagram illustrating the system of the present invention.

The present invention is a method of implementing a lightweight, electronic ear tag for tracking herd animals. More specifically, an energy-efficient, cost-effective Long-Range Wide Area (LoRa-WAN) network relays location and sensing data from an electronic ear tag attached to an animal to a cloud network for storage and further processing. This allows the animal's owner to track and control the electronic ear tag as suited. Accordingly, the at least one remote server, at least one electronic ear tag, and at least one communication node are shown in FIG. 1, wherein the electronic ear tag comprises a location-tracking device, a low-power transceiver, a microcontroller, and at least one power source, and wherein the communication node comprises a low-power gateway and a high-power gateway (Step A).

Figure 2:
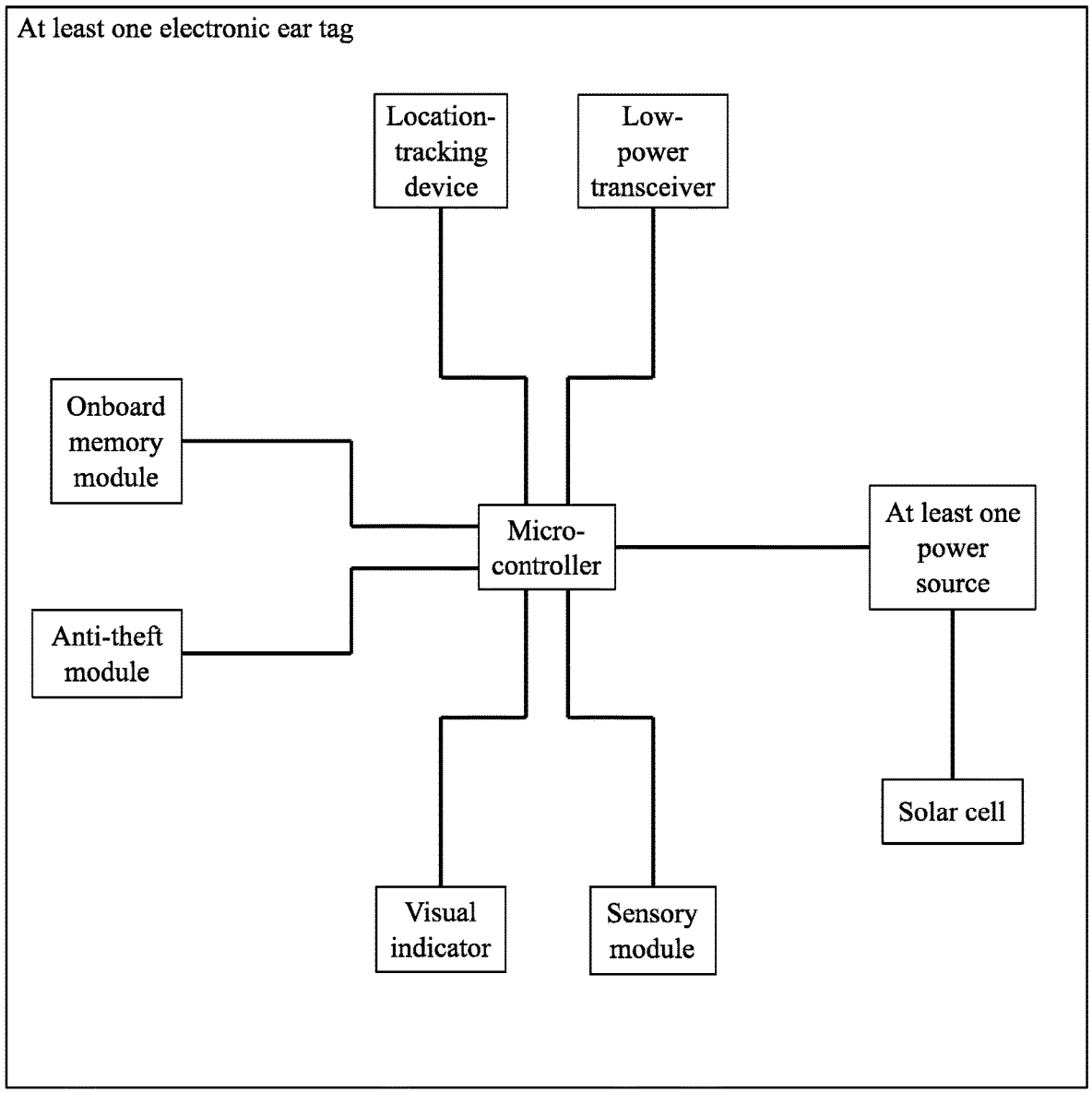
FIG. 2 is a block diagram illustrating the componentry of the electronic ear tag.

As can be seen in FIG. 2, the electronic ear tag comprises a tag body for containing the electronic components of the present invention. The tag body is a rigid body circuit board protected by a casing material. The casing material is a thermoplastic elastomer which is UV resistant with rubber properties. The tag body is designed to allow the power source to expand and contract as well as protect the internal components from wear and tear. As such, the tag body is water and dust proof, as well as resistant to damage from sunlight, external forces, and water. In addition, the microcontroller is used to manage data and controls for the electronic ear tag. Moreover, the power source is preferably a solar powered battery. Accordingly, the electronic ear tag can be powered reliably with an ample supply of sunlight, without the need to manually recharge or replace the battery. Moreover, the electronic ear tag may include a sensing module that can take, but is not limited to, a temperature reading.

In one embodiment, the communication node may be a tower for affixing the low-power gateway and the high-power gateway. The low-power gateway is in two-way communication with the low-power transceiver in the electronic ear tag. This enables the creation of low-power network between the low-power transceiver and the communication node for the cost-effective, power-efficient, and secure exchange of data. In one embodiment, the low-power network may be a LoRaWAN network. Accordingly, the low-power transceiver may be a LoRaWAN transceiver and the low-power gateway may be a LoRaWAN gateway. Once received at the communication node, the data from the low-power transceiver is relayed to the remote server via a high-power network. The high-power network is enabled by communicably linking the high-power gateway to the remote server.

The high-power network enables long-range communication between the communication node and the remote server. In one embodiment, the high-power network can be enabled by, but is not limited to, a Wi-Fi, copper landline, or fiber network, allowing high speed and low latency communication with the remote server. Further, the high-power network can also be, but is not limited to, a cellular (3G, 4G, 5G, etc.) or satellite backhaul capable of receiving data from the electronic ear tag and relaying the data to a front-end web application, Android, and/or an iOS app. The high-power network also allows the owner to send data back to the electronic ear tag such as short commands including features such as reboot, blink LEDs, change mode, and request historical data. Accordingly, the high-power gateway may include a Wi-Fi router, a cellular modem, and/or a satellite transceiver for long range communication.

Figure 3:
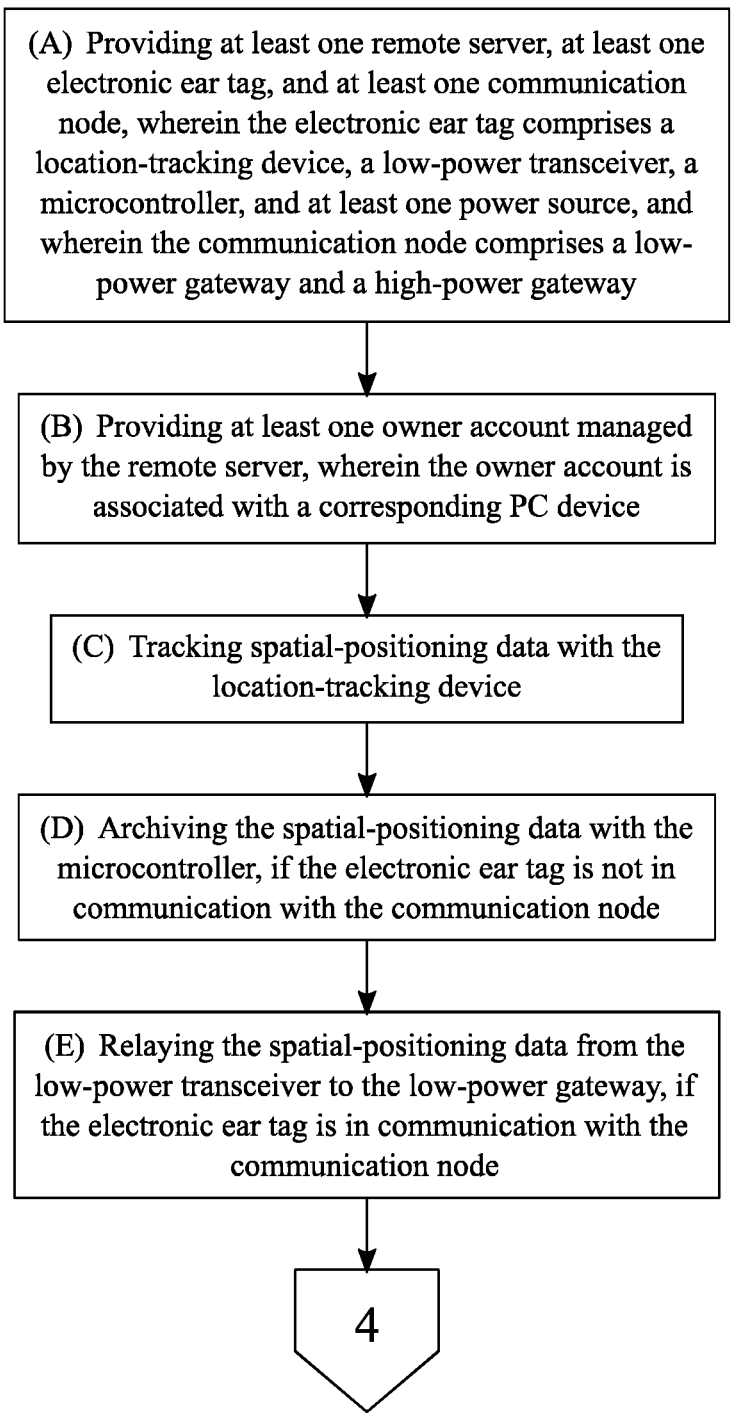
FIG. 3 is a flowchart illustrating the overall process for the method of the present invention.

The remote server may be a standalone system or integrated into a more comprehensive network of servers, databases, and computing resources as those found in a cloud-computing network. The owner account is hosted on the remote server and is accessible through the corresponding PC device. Accordingly, at least one owner account managed by the remote server is provided (Step B). The owner account enables an owner to monitor, track, and control the movement of the animal through the corresponding PC device. The corresponding PC device as herein mentioned includes, but is not limited to, smartphones, laptops, desktop, personal digital assistants (PDAs), smartwatches, and the like. Accordingly, the location-tracking device tracks the spatial-positioning data (Step C), which is shown in FIG. 3. The spatial-positioning data may include GPS coordinates of the electronic ear tag, as well as the altitude, timestamp, satellite information, power levels, and other related information.

In case the electronic ear tag loses connection with the communication node, the microcontroller is programmed to store the spatial-coordinates data until connection is regained. As such, the microcontroller archives the spatial-positioning data, if the electronic ear tag is not in communication with the communication node (Step D).

Alternately, if the low-power transceiver detects the low-power gateway, the spatial-positioning data is transmitted to the communication node. As such, the low-power transceiver relays the spatial-positioning data to the low-power gateway, if the electronic ear tag is in communication with the communication node (Step E).

Figure 4:
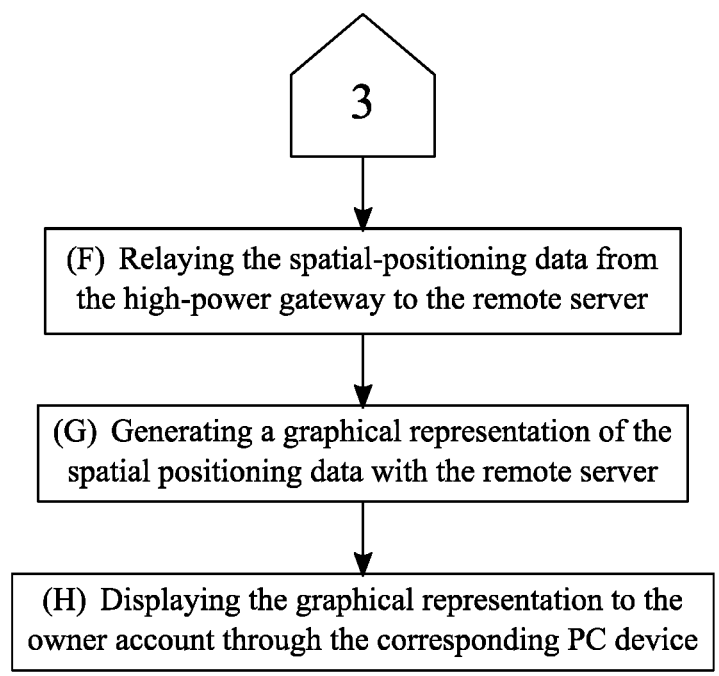
FIG. 4 is a continuation of FIG. 3.

Finally, the spatial-positioning data is relayed from the high-power gateway to the remote server (Step F), which is shown in FIG. 4. The remote server runs custom software designed to handle herd tracking and monitoring. The software is web-based, Android and/or iOS application interface enabling the owner account to interact with the electronic ear tag. In the preferred embodiment, the remote server enables the owner account to set up geo-fenced alert zones which trigger alerts if animals cross the boundaries of the geo-fenced locations. Further, the remote server allows several user interface systems for ease of use and greater interactivity.

As such, the remote server generates a graphical representation of the spatial positioning data (Step G). Subsequently, the corresponding PC device displays the graphical representation to the owner account (Step H). Preferably, the location of the electronic ear tag is displayed in any kind of geospatial mapping software using API calls (e.g. Google Maps). This also facilitates the geo-fencing by simply drawing a boundary on a geospatial mapping software.

Figure 5:
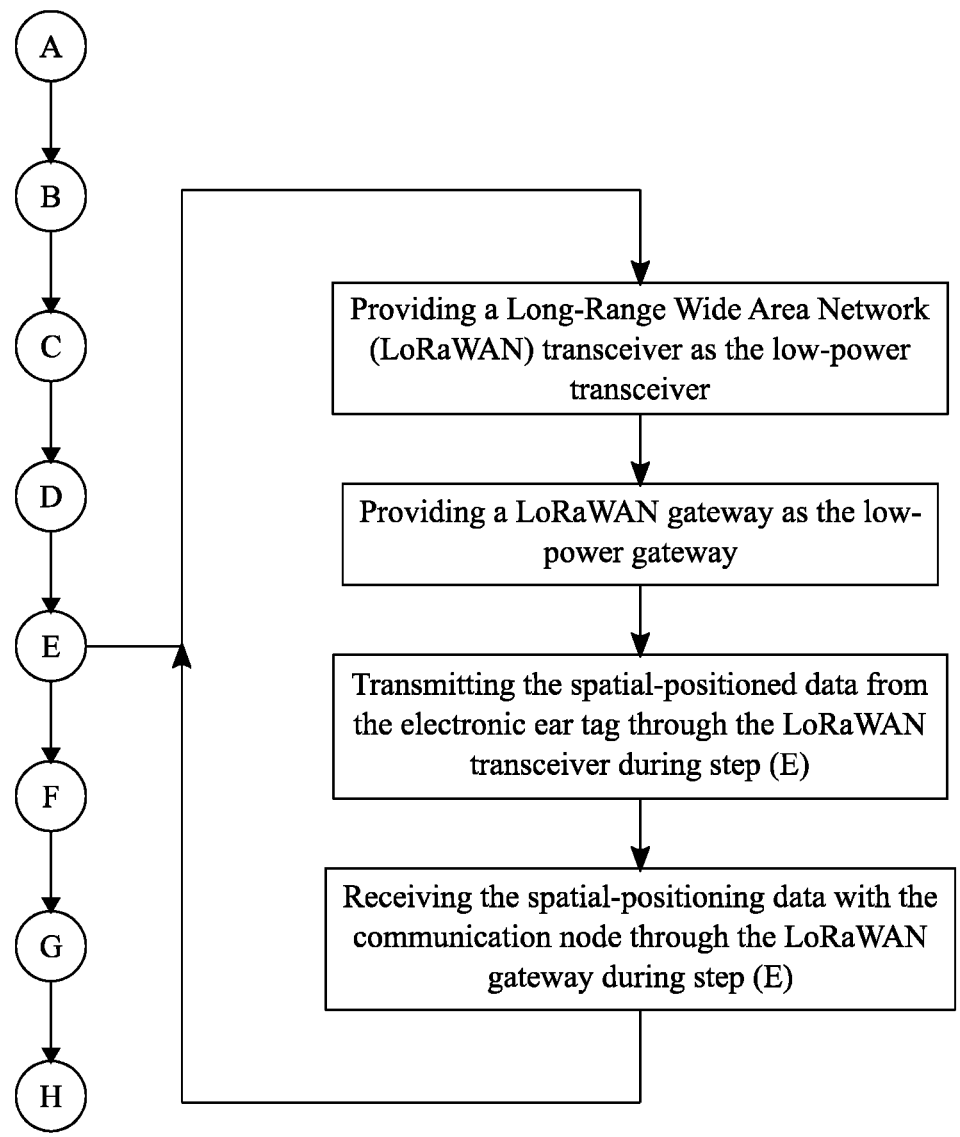
FIG. 5 is a flowchart illustrating the subprocess of the electronic ear tag communicating with the communication node over a long-range wide-area network.

In the preferred embodiment, the spatial-positioning data is encrypted and transmitted using LoRaWAN protocol. As such, a LoRaWAN transceiver is provided as the low-power transceiver, which is shown in FIG. 5. Further, a LoRaWAN gateway provided as the low-power gateway. Subsequently, the LoRaWAN transceiver transmits the spatial-positioning data from the electronic ear tag during Step E. Preferably, the spatial-positioning data is transmitted in pulses with constant intervals. The frequency of transmission can be adjusted depending on the power level of the electronic ear tag and urgency of the transmission. Accordingly, the LoRaWAN gateway receives the spatial-positioning data with the communication node during Step E. Further, the LoRaWAN gateway can also transmit signals encrypted using LoRaWAN protocol towards the electronic ear tag. This allows the electronic ear tag to receive commands from the owner account to switch between different operational modes.

Figure 6:
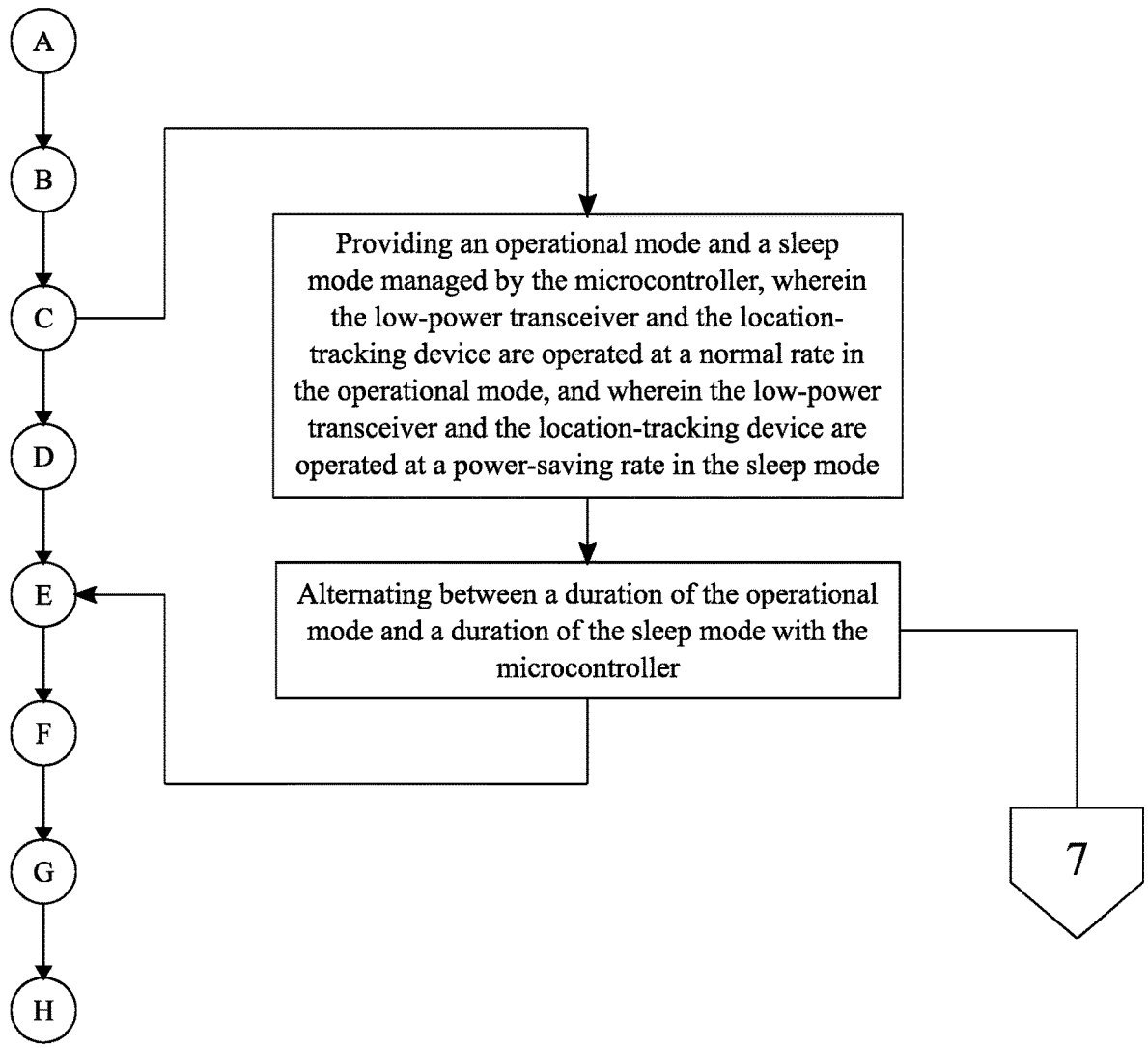
FIG. 6 is a flowchart illustrating the subprocess of alternating the electronic ear tag between an operational mode and a sleep mode.

In some embodiments of the present invention, the microcontroller adjusts the power management settings for the electronic ear tag through an operational mode and a sleep mode, which is shown in FIG. 6. The operational mode and the sleep mode are focused around adjusting the power consumption of the low-power transceiver and the location-tracking device because the low-power transceiver and the location-tracking device are the most power consuming components of the electronic ear tag. More specifically, the low-power transceiver and the location-tracking device are operated at a normal rate in the operational mode. The normal rate applies a larger power consumption on the power source but allows the low-power transceiver and the location-tracking device to function in a regular capacity. Conversely, the low-power transceiver and the location-tracking device are operated at a power-saving rate in the sleep mode. The power-saving rate applies a smaller power consumption on the power source but allows the low-power transceiver and the location-tracking device to only function in a significantly reduced capacity or not at all. Thus, the microcontroller alternates between a duration of the operational mode and a duration of the sleep mode in order to reduce the overall power consumption on the power source over time. This is because the normal rate of operating the low-power transceiver and the location-tracking device is preferably within a microampere range, while the power-saving rate of operating the low-power transceiver and the location-tracking device is preferably within a nanoampere range, which is an electrical current difference of several orders of magnitude.

Figure 7:
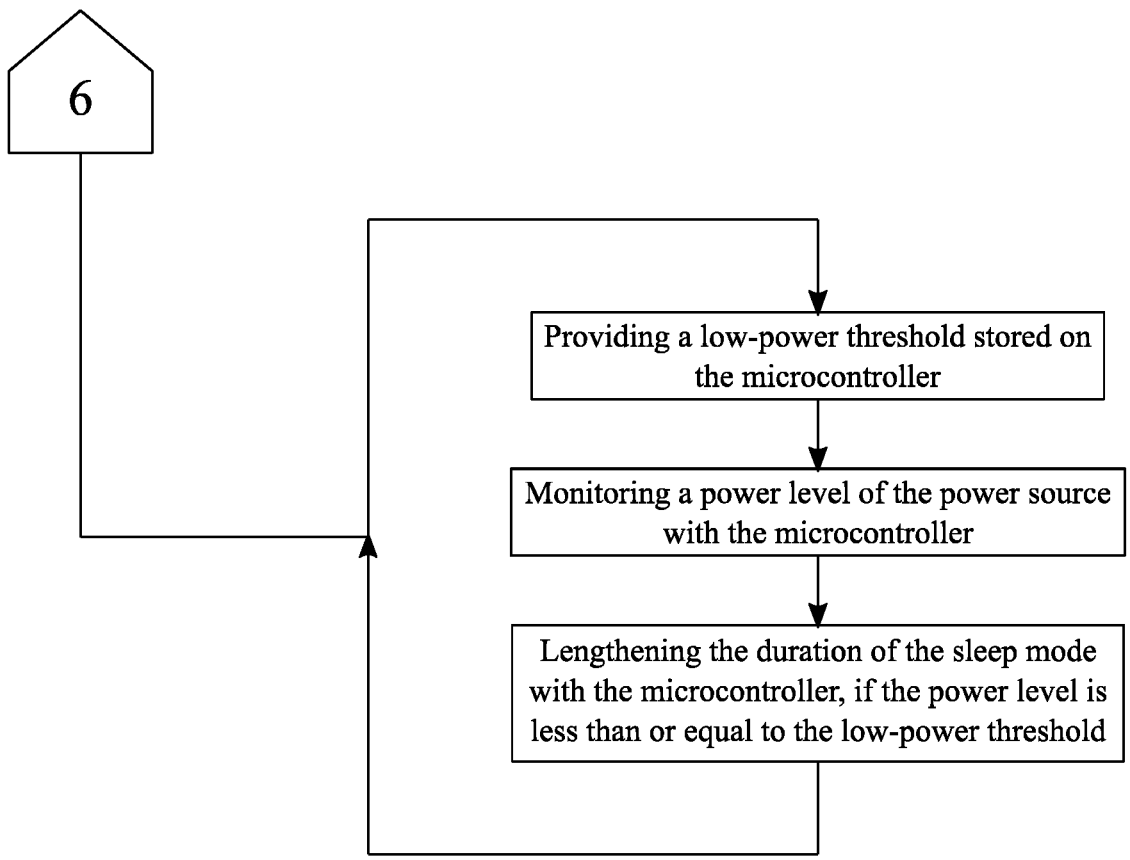
FIG. 7 is a flowchart illustrating a subprocess of further conserving power for the electronic ear tag.

In some embodiments of the present invention, the microcontroller further adjusts the power management settings for the electronic ear tag in order to address the power source being at a critically low power level, which is shown in FIG. 7. A low-power threshold is stored on the microcontroller and provides the microcontroller with a baseline power-level, below which the electronic ear tag may be in danger of shutting down. The low-power threshold preferably corresponds to the power-level that is too low to transmit for the low-power transceiver. However, the low-power transceiver may still be capable of receiving signals. Thus, the microcontroller continuously monitors a power level of the power source so that the microcontroller is able to constantly track the remaining available power from the power source. If the power level becomes less than or equal to the low-power threshold, then the microcontroller lengthens the duration of the sleep mode, which allows the electronic ear tag to conserve power and provides a solar cell of the electronic ear tag with enough time to recharge the power source to a comfortable operational power level.

Figure 8:
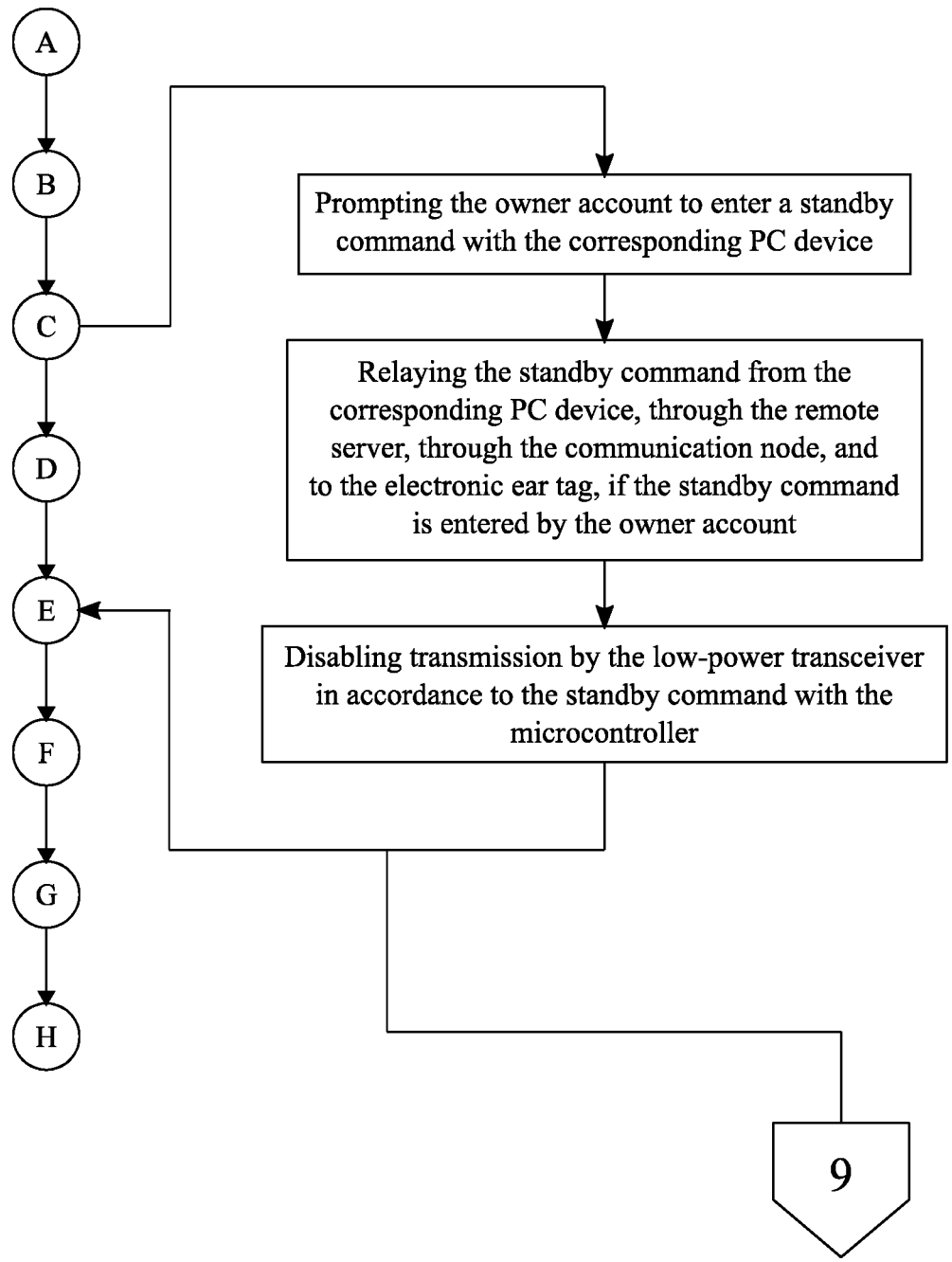
FIG. 8 is a flowchart illustrating the subprocess of disabling transmission by the electronic ear tag with a standby command.

Alternately, the owner account may manually control the low-power transceiver by sending a command through the remote server, which is shown in FIG. 8. As such, the corresponding PC device prompts the owner account to enter a standby command. The standby command temporarily stops the low-power transceiver from transmitting. In this case, the corresponding PC device may flash a prompt on the screen for the owner to examine. Accordingly, the standby command is relayed from the corresponding PC device, through the remote server, through the communication node, and to the electronic ear tag, if the standby command is entered by the owner account. This allows the owner to remote control the electronic ear tag. Finally, the microcontroller disables transmission by the low-power transceiver in accordance to the standby command. Preferably, the low-power transceiver is still able to receive the signals from the communication node thereby giving control to the owner.

Figure 9:
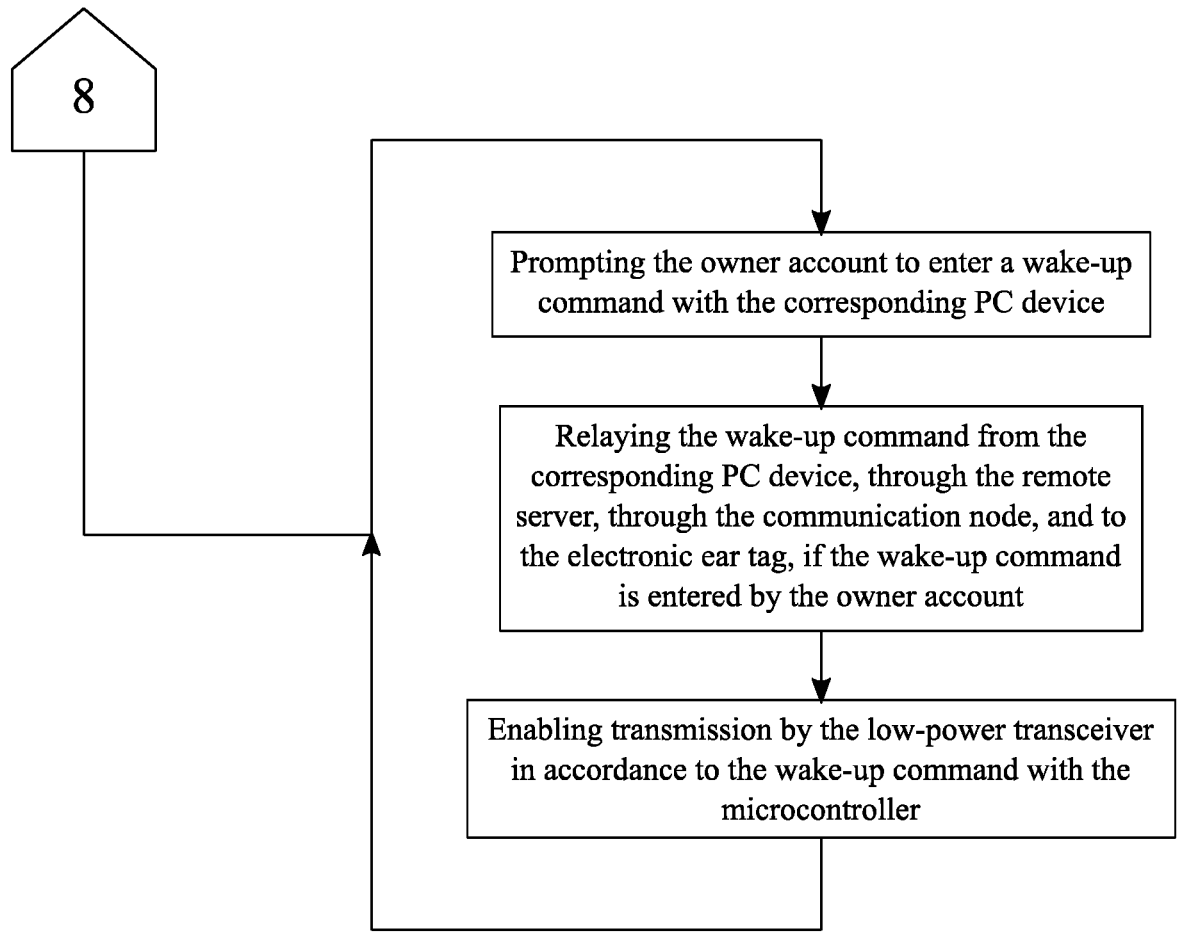
FIG. 9 is a flowchart illustrating the subprocess of enabling transmission by the electronic ear tag with a wake-up command.

Accordingly, the owner account can wake the low-power transceiver to reenable two-way communication, which is shown in FIG. 9. As such, the corresponding PC device prompts the owner account to enter a wake-up command. The wake-up command may be utilized when there is ample source of sunlight available for powering the electronic ear tag through its solar cell. Subsequently, the wake-up command is relayed from the corresponding PC device, through the remote server, through the communication node, and to the electronic ear tag, if the wake-up command is entered by the owner account. Finally, the microcontroller enables transmission of the low-power transceiver in accordance to the wake-up command. In particular, the microcontroller may re-establish electrical connection between the power source and the low-power transceiver.

Figure 10:
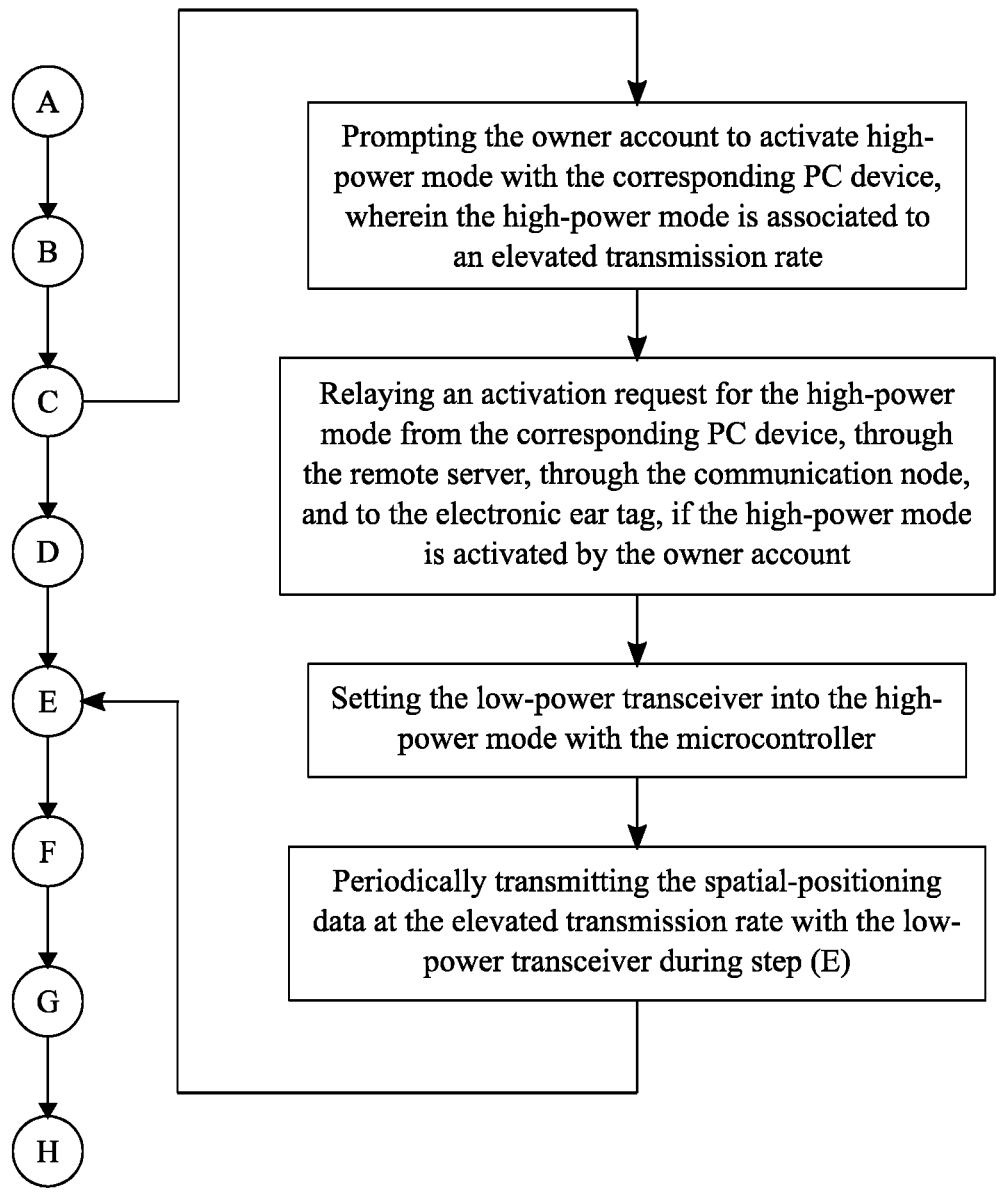
FIG. 10 is a flowchart illustrating the subprocess of transmitting in a high-power mode with the electronic ear tag.

In the preferred embodiment, the microcontroller adjusts the interval at which the low-power transceiver transmits based on the power level or urgency, which is shown in FIG. 10. The corresponding PC device prompts the owner account to activate high-power mode, wherein the high-power mode is associated to an elevated transmission rate. The elevated transmission rate decreases the interval between transmissions of the low-power transceiver. This allows for more accurate tracking of the animal as the spatial-positioning data is updated at an elevated rate. For example, the high-power mode may recover or track a stolen or lost animal. Subsequently, an activation request for the high-power mode is relayed from the corresponding PC device, through the remote server, through the communication node, and to the electronic ear tag, if the high-power mode is activated by the owner account. As such, the microcontroller sets the low-power transceiver into the high-power mode. Subsequently, the low-power transceiver periodically transmits the spatial-positioning data at the elevated transmission rate with during Step E.

Figure 11:
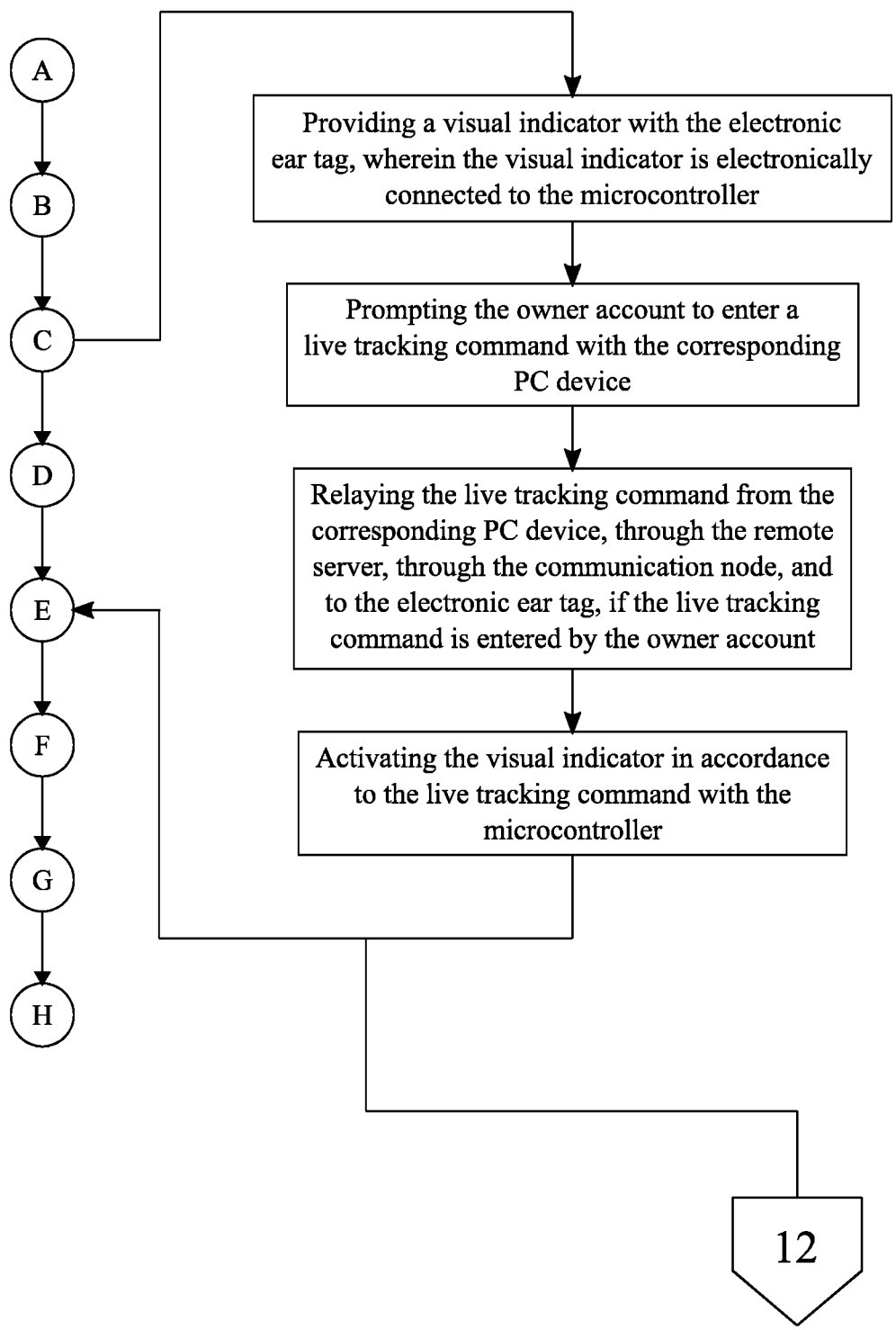
FIG. 11 is a flowchart illustrating the subprocess of activating a visual indicator of the electronic ear tag with a live tracking command.

As another theft prevention mechanism, the electronic ear tag is equipped with lights that flash when prompted by the owner account, which is shown in FIG. 11. As such, a visual indicator with the electronic ear tag is provided, wherein the visual indicator is electronically connected to the microcontroller. In the preferred embodiment, the visual indicator may comprise a plurality of light emitting diodes (LEDs) having multiple colors. The corresponding PC device prompts the owner account to enter a live tracking command. The live tracking command causes the visual indicator to emit lights and/or sounds in order to find that animal in the field in low-light conditions. As such, the live tracking command is relayed from the corresponding PC device, through the remote server, through the communication node, and to the electronic ear tag, if the live tracking command is entered by the owner account. As such, the microcontroller continuously activates the visual indicator in accordance to the live tracking command. Alternately, the visual indicator may flash periodically in different colors to preserve the power level. In some embodiments, the live-tracking command and the high-power mode are simultaneously executed by the electronic ear tag, which further assists in recovering or tracking a stolen or lost animal.

Figure 12:
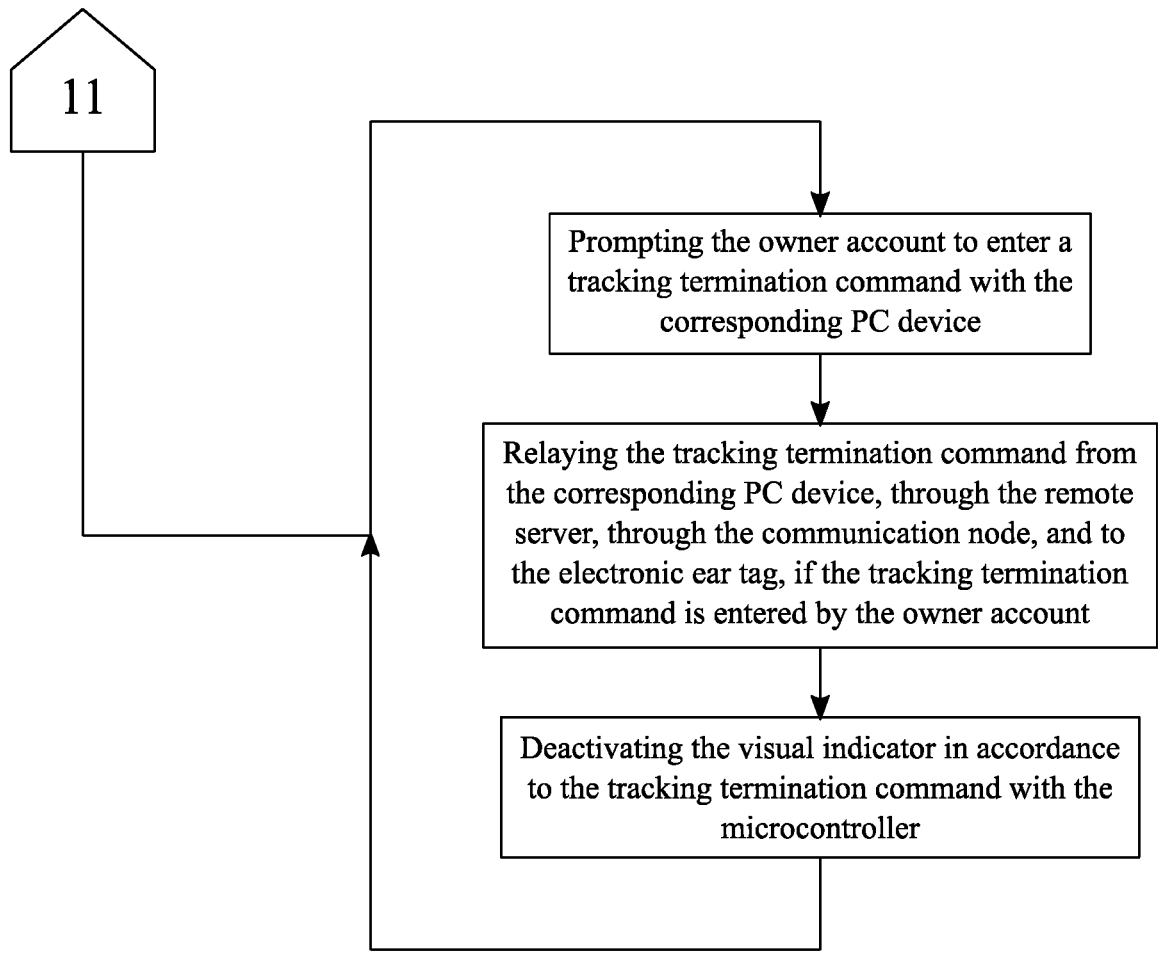
FIG. 12 is a flowchart illustrating the subprocess of deactivating the visual indicator of the electronic ear tag with a tracking termination command.

Similarly, the owner account can terminate the live tracking command by sending a termination command through the corresponding PC device, which is shown in FIG. 12. As such, the corresponding PC device prompts the owner account to enter a tracking termination command. Accordingly, the tracking termination command is relayed from the corresponding PC device, to the remote server, through the communication node, and to the electronic ear tag, if the tracking termination command is entered by the owner account. The tracking termination is used to deactivate the visual illumination of the electronic ear tag, thereby obscuring the location of the animal. This feature may be used to hide the animal's location from predators or thieves or may be used to turn off the visual illumination of the electronic ear tag after locating the stolen or lost animal. Consequently, the microcontroller deactivates the visual indicator in accordance to the tracking termination command.

Figure 13:
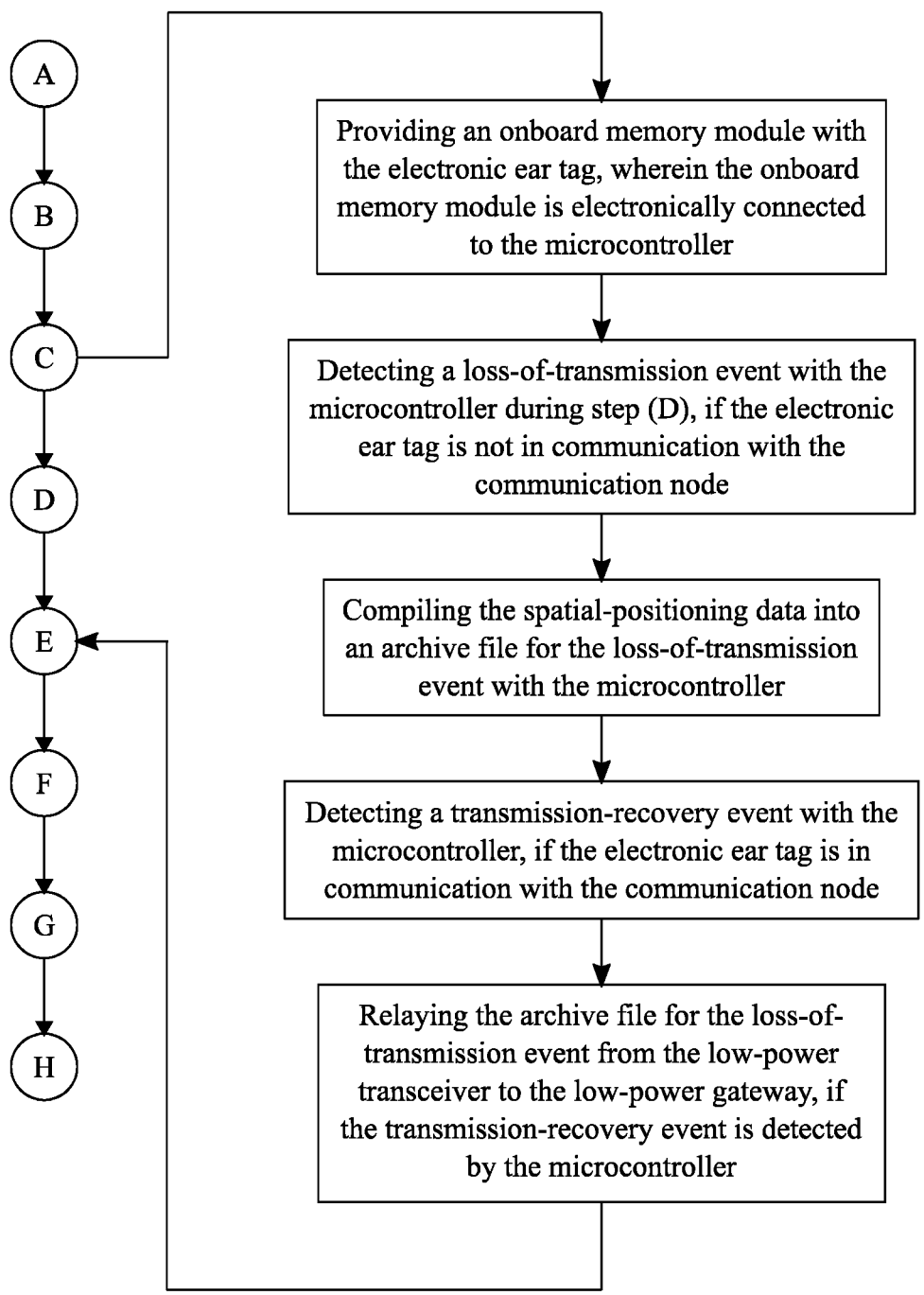
FIG. 13 is a flowchart illustrating the subprocess of archiving spatial-positioning data of the electronic ear tag during a loss-of-transmission event.

As can be seen in FIG. 13, if the electronic ear tag loses connection with the communication node, the spatial-positioning reading is stored locally by the microcontroller. As such, the electronic ear tag is provided with an onboard memory module, wherein the onboard memory module is electronically connected to the microcontroller. The onboard memory module utilizes a non-volatile memory unit, such as flash, to store data without the power. Accordingly, the microcontroller detects a loss-of-transmission event during Step D, if the electronic ear tag is not in communication with the communication node. The loss-of-transmission event may be triggered if the animal strays out of the range of the communication node or if transmission is stopped to the communication node. Subsequently, the microcontroller compiles the spatial-positioning data into an archive file for the loss-of-transmission event. This archive file is of an arbitrary size and may change size depending on the duration of loss of transmission. Subsequently, the␣microcontroller detects a transmission-recovery event, if the electronic ear tag returns to be in communication with the communication node. The transmission recovery event is triggered when the low-power transceiver reconnects with the communication node, thereby enabling two-way communication. As such, the archive file for the loss-of-transmission event is relayed from the low-power transceiver to the low-power gateway, if the transmission-recovery event is detected by the microcontroller. This allows the owner account to examine the animal's movement during the loss-of-transmission event.

In the preferred embodiment of the present invention, the location-tracking device is a Global Positioning System (GPS) transceiver. The GPS transceiver utilizes a GPS/Global Navigation Satellite System (GNSS)/Glonass satellite positioning system to precisely track the location of the animal. Alternately, the location-tracking device may utilize another satellite networking system to obtain the location of the electronic ear tag.

Figure 14:
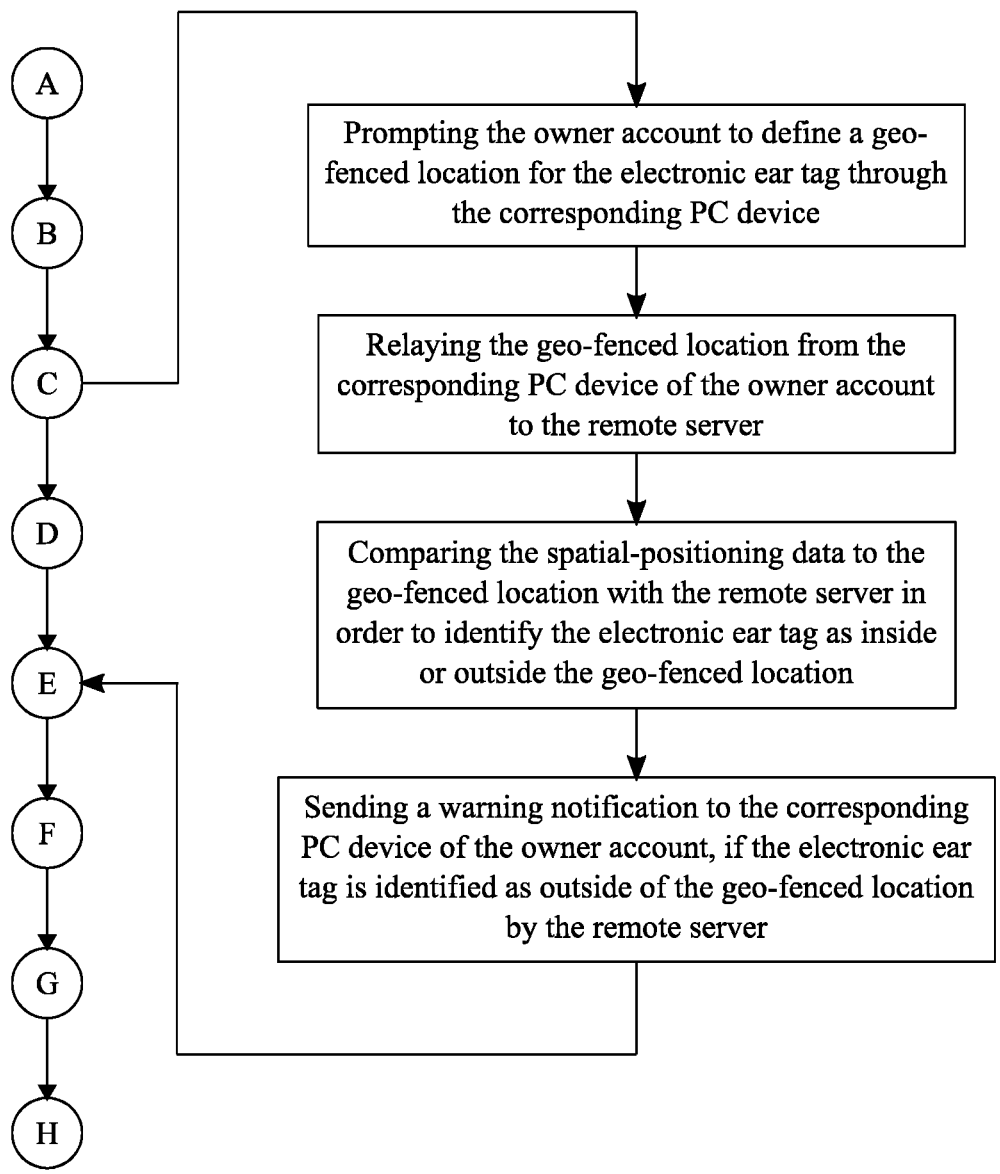
FIG. 14 is a flowchart illustrating the subprocess of notifying an owner account if the electronic ear tag is outside of a geo-fenced location.

Accordingly, the corresponding PC device prompts the owner account to define a geo-fenced location for the electronic ear tag, which is shown in FIG. 14. The user may simply draw a boundary on the touchscreen of corresponding PC device. The geo-fenced location helps the owner to setup a notification system for the movement of the animal, which helps to prevent theft of the animal. Subsequently, the corresponding PC device of the owner account relays the geo-fenced location to the remote server. The remote server then compares the spatial-positioning data to the geo-fenced location in order to identify the electronic ear tag as inside or outside the geo-fenced location. If an animal steps out of the geo-fenced location, then the present invention configured to notify the owner account. Accordingly, a warning notification is sent to the corresponding PC device of the owner account, if the electronic ear tag is identified as outside of the geo-fenced location by the remote server. More specifically, the remote server may send an alarm notification to the owner account to prevent the animal from getting lost or stolen.

Figure 15:
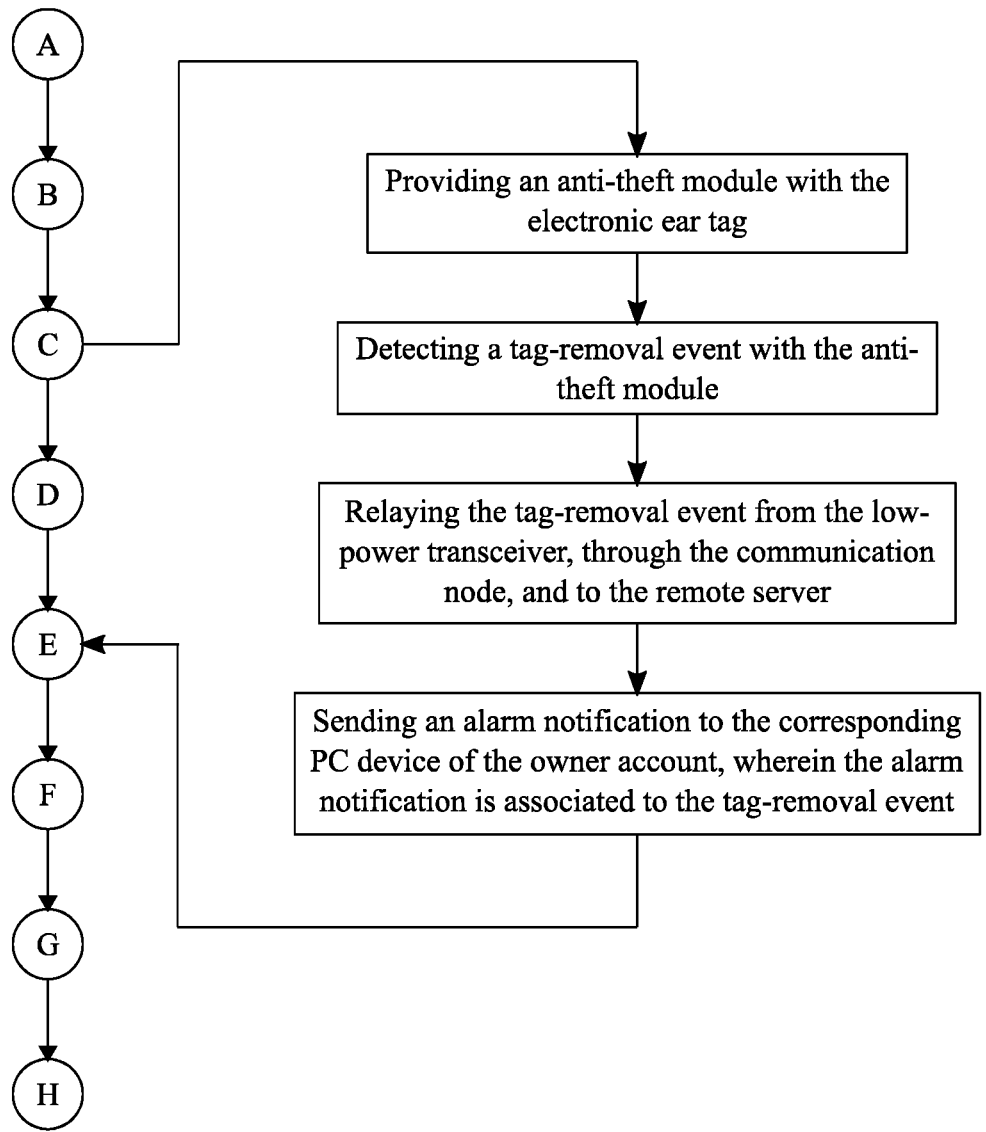
FIG. 15 is a flowchart illustrating the subprocess of notifying an owner account of a tag-removal event for the electronic ear tag.

Similarly, the present invention also has an anti-theft module which notifies the owner account if the animal is stolen, which is shown in FIG. 15. Preferably, the anti-theft module is provided with the electronic ear tag. As such, the anti-theft module detects a tag-removal event. The preferred anti-theft module utilizes a theft-prevention wire that runs around a tag fastener, which fastens the electronic ear tag to the animal's ear. The tag-removal event is triggered if the circuit around the theft-prevention wire is broken, indicating that the electronic ear tag has been forcibly removed. Subsequently, the tag-removal event is relayed from the low-power transceiver, through the communication node, and to the remote server. The remote server is programmed to immediately notify the owner, as well as all other relevant parties. As such, an alarm notification is sent to the corresponding PC device of the owner account, wherein the alarm notification is associated to the tag-removal event. The alarm notification may cause the corresponding PC device of the owner account to output a loud sound and/or bright lights to gain the attention of the owner.

Figure 16:
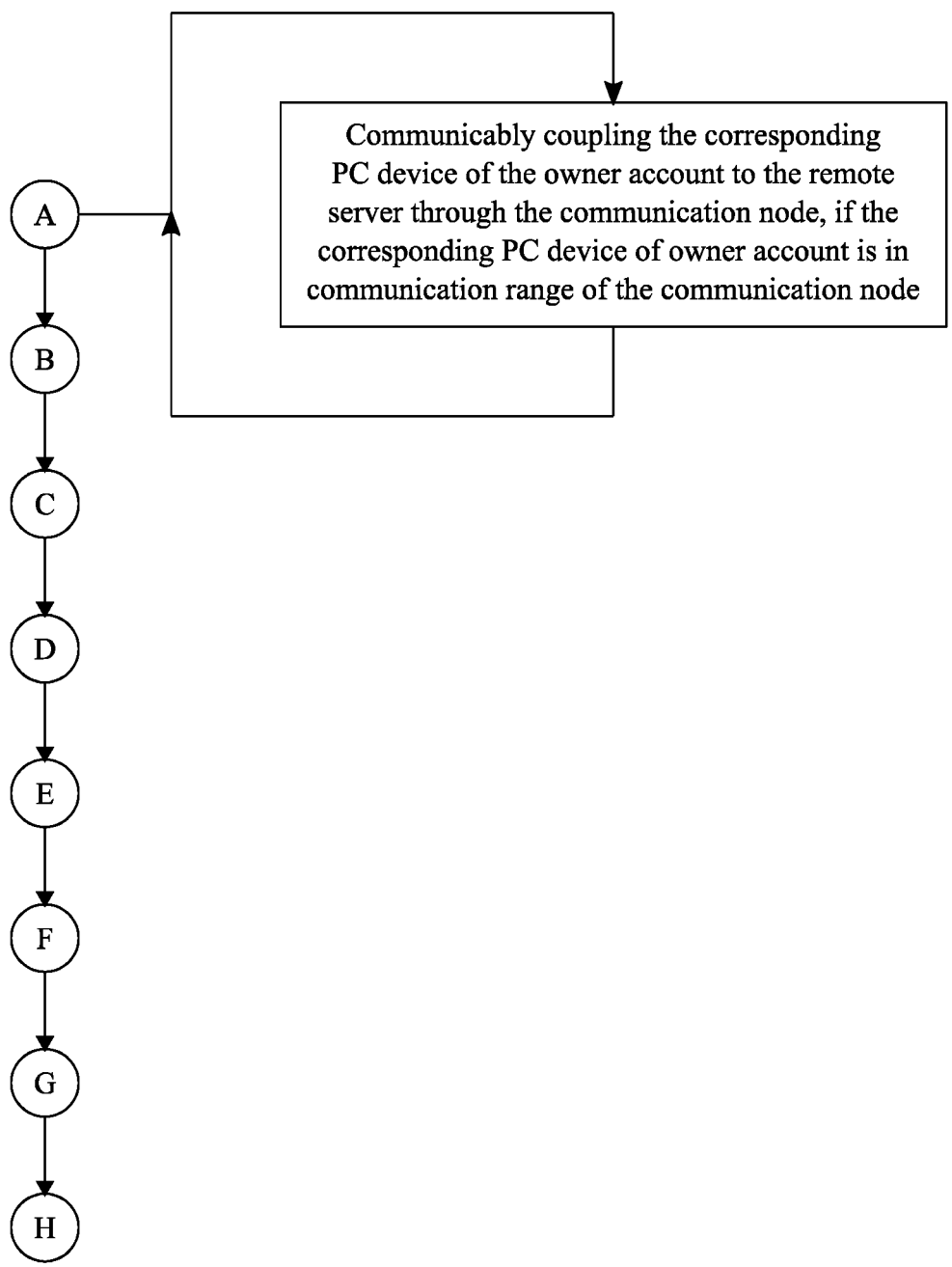
FIG. 16 is a flowchart illustrating the subprocess of enabling communication between the PC device and the remote server through the communication node.

In one embodiment, the communication node is equipped with a separate Wi-Fi module, which allows the corresponding PC device to communicably couple with the remote server. This feature is particularly useful in remote areas without cellular or internet coverage, where animals usually graze. As such, the corresponding PC device of the owner account is communicably coupled to the remote server through the communication node, if the corresponding PC device of owner account is in communication range of the communication node, which is shown in FIG. 16. This allows the corresponding PC device to transmit information to the Wi-Fi module, which is then transmitted to the remote server by the high-power gateway. Preferably, the high-power gateway uses a cellular network to connect to the remote server. Alternately, the high-power gateway may also use a satellite transceiver to connect to the remote server. Similarly, the remote server is able to relay signal back through the high-power gateway and the Wi-Fi module to the corresponding PC device. Thus, two-way communication is achieved between the remote server and the corresponding PC device.

As mentioned, in the preferred embodiment, data from the electronic ear tag is transmitted to the remote server via a cellular network. As such, the communication node is a network node within a cellular network.

In some embodiments, the communication node may utilize an existing internet connection, for example, the wireless internet at the owner's residence, to communicably couple with the remote server. As such, the communication node is a network node within a local area network. If a plurality of communication nodes is utilized, the data can be relayed to the remote server as long as at least one communication node is in range of the local area network deployed at the owner's residence. In some other embodiments, the communication node is a network node within a satellite network, which allows the electronic ear tag in a very remote geospatial region to still communicate with the remote server through the communication node.

Figure 17:
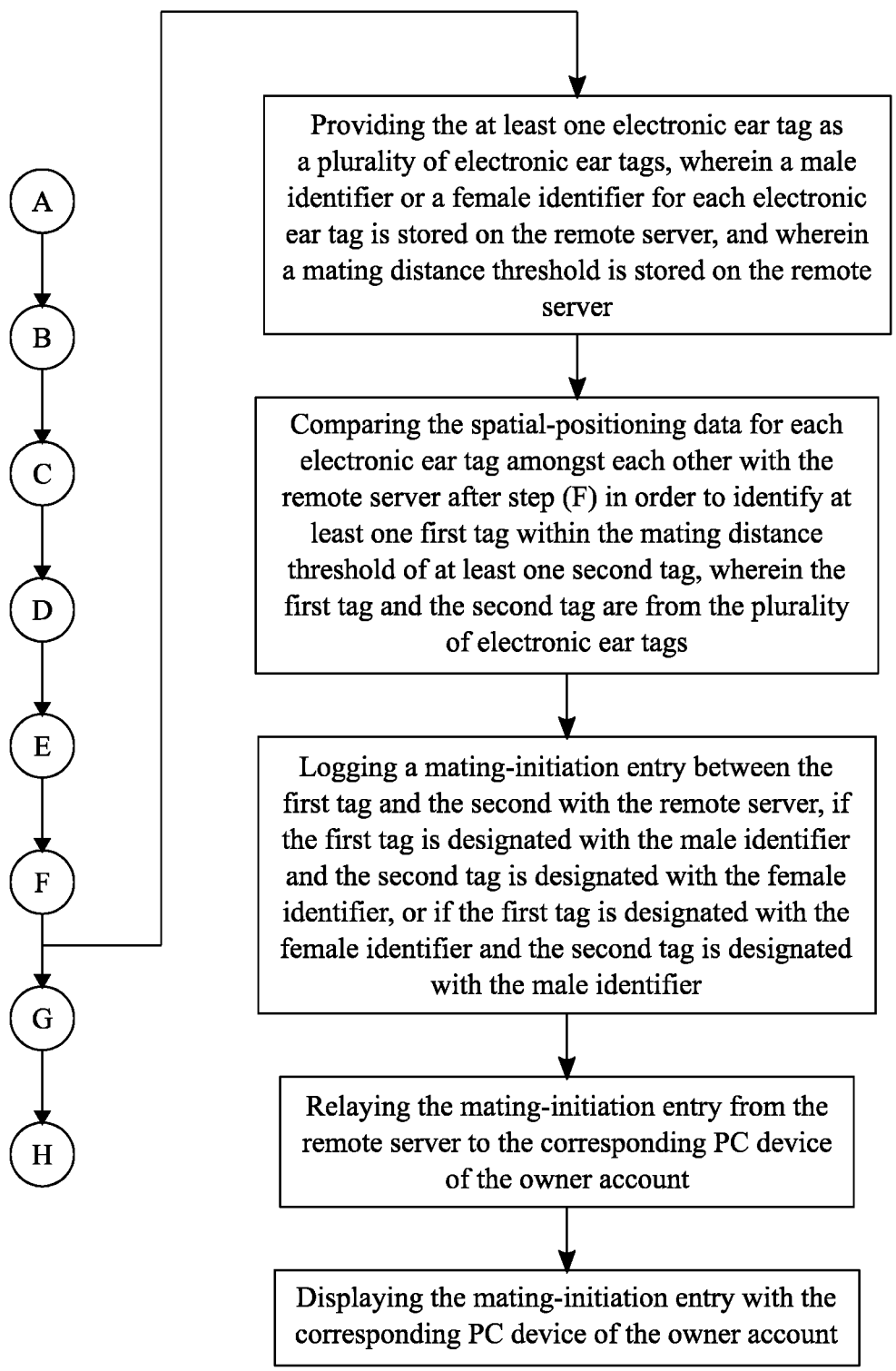
FIG. 17 is a flowchart illustrating the subprocess of notifying a mating incidence between two animals in the herd, wherein an electronic ear tag is attached to each of the two animals.

As can be seen in FIG. 17, some embodiments also allow the present invention to track instances of when a pair of animals is mating. Thus, the at least one electronic ear tag needs to be provided as a plurality of electronic ear tags, each of which is attached to a corresponding animal in a herd. Moreover, each electronic ear tag is associated with a male identifier or a female identifier, which is based on the biological sex of the corresponding animal. The male identifier or the female identifier for each electronic ear tag is stored on the remote server for future reference. In addition, a mating distance threshold is similarly stored on the remote server for future reference. The mating distance threshold is the distance at which two animals are physically close enough to copulate. The detection of a mating instance begins after Step F by comparing the spatial-positioning data for each electronic ear tag amongst each other with the remote server in order to identify at least one first tag within the mating distance threshold of at least one second tag, wherein the first tag and the second tag are from the plurality of electronic ear tags. This means that the corresponding animals for the first tag and the second tag are physically close enough to potentially copulate. Consequently, if the first tag is designated with the male identifier and the second tag is designated with the female identifier, or if the first tag is designated with the female identifier and the second tag is designated with the male identifier, then the remote server logs a mating-initiation entry between the first tag and the second tag so that the remote server is able to record the date-and-time of a mating instance between the corresponding animals for the first tag and the second tag. The remote server is also able to relay the mating-initiation entry to the corresponding PC device of the owner account, which allows the corresponding PC device of the owner account to display the mating-initiation entry. This allows the user of the owner account to be notified of the date-and-time of the mating instance between the corresponding animals for the first tag and the second tag.

Figure 18:
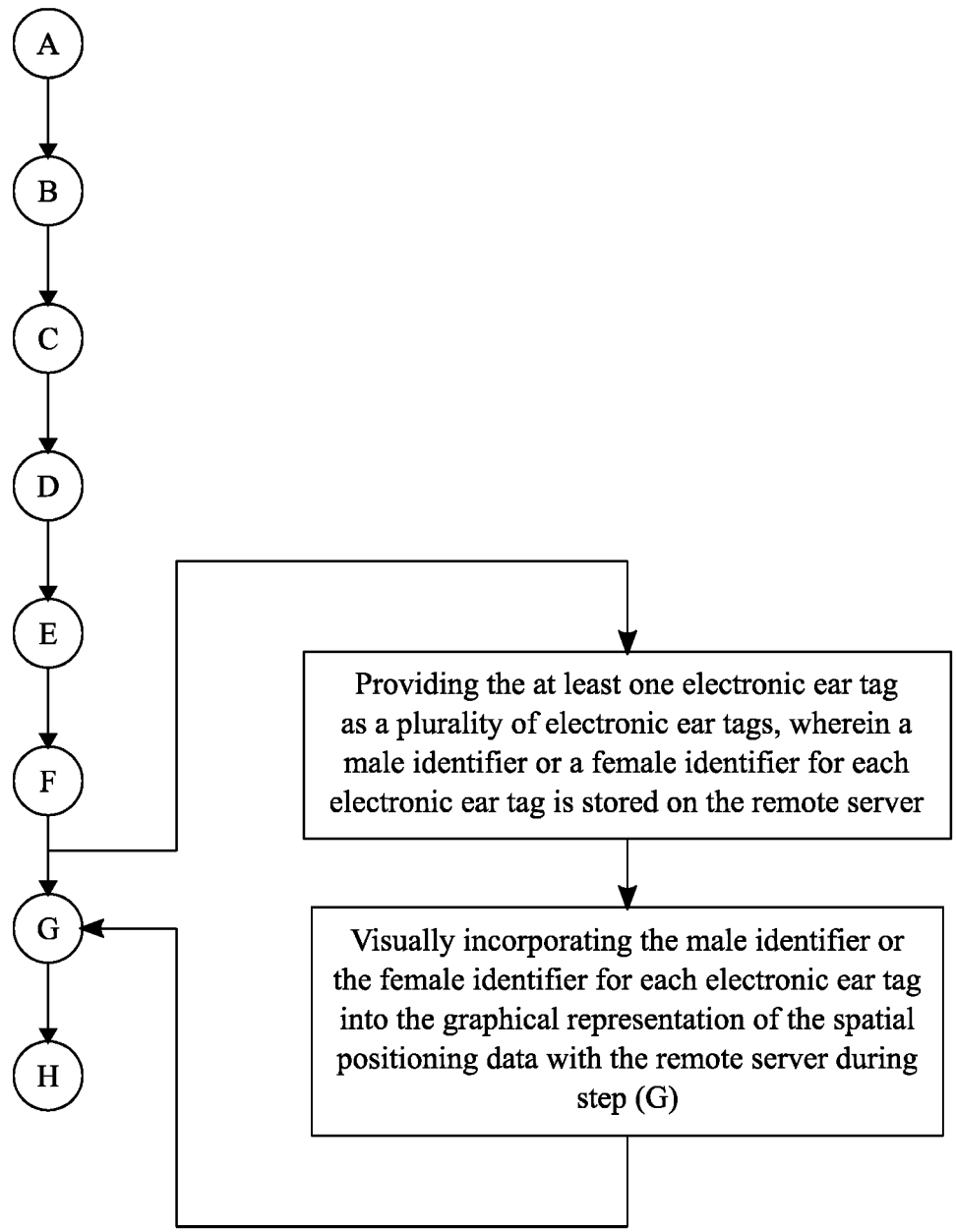
FIG. 18 is a flowchart of illustrating the subprocess of displaying the spatial positioning and the biological sex of each animal in the herd, wherein an electronic ear tag is attached to each animal.

As can be seen in FIG. 18, some embodiments allow the user of the owner account to view the biological sex of each animal in the herd in real time. Similar to tracking instances of when a pair of animals is mating, a male identifier or a female identifier for each electronic ear tag is stored on the remote server. Thus, the remote server visually incorporates the male identifier or the female identifier into the graphical representation of the spatial positioning data during Step G. When the graphical representation is displayed to the owner account through the corresponding PC device during Step H, the user of owner account will be able to view the spatial positioning and the biological sex of each animal in the herd in real-time. The present invention preferably displays the male identifier in a blue color and the female identifier in a pink color during Step H.

Although the invention has been explained in relation to its preferred embodiment, it is to be understood that many other possible modifications and variations can be made without departing from the spirit and scope of the invention as hereinafter claimed.

What is claimed is:

1. A method of implementing a lightweight, electronic ear tag for location tracking and geo-fencing tasks comprises the steps of:
   (A) providing at least one remote server, at least one electronic ear tag, and at least one communication node, wherein the electronic ear tag comprises a location-tracking device, a low-power transceiver, a microcontroller, and at least one power source, and wherein the communication node comprises a low-power gateway and a high-power gateway;
   (B) providing at least one owner account managed by the remote server, wherein the owner account is associated with a corresponding Personal Computer (PC) device;
   (C) tracking spatial-positioning data with the location-tracking device;
   (D) archiving the spatial-positioning data with the microcontroller, if the electronic ear tag is not in communication with the communication node;
   (E) relaying the spatial-positioning data from the low-power transceiver to the low-power gateway and the high-power gateway, if the electronic ear tag is in communication with the communication node;
   (F) relaying the spatial-positioning data from the high-power gateway to the remote server;
   (G) generating a graphical representation of the spatial positioning data with the remote server; and
   (H) transmitting the graphical representation from the remote server to the corresponding PC device and displaying the graphical representation to the owner account through the corresponding PC device.

2. The method as claimed in claim 1 comprises the steps of:
   providing a Long-Range Wide Area Network (LoRaWAN) transceiver as the low-power transceiver;
   providing a LoRaWAN gateway as the low-power gateway;
   transmitting the spatial-positioned data from the electronic ear tag through the LoRaWAN transceiver during step (E); and
   receiving the spatial-positioning data with the communication node through the LoRaWAN gateway during step (E).

3. The method as claimed in claim 1 comprises the steps of:
   providing an operational mode and a sleep mode managed by the microcontroller, wherein the low-power transceiver and the location-tracking device are operated at a normal rate in the operational mode, and wherein the low-power transceiver and the location-tracking device are operated at a power-saving rate in the sleep mode; and
   alternating between a duration of the operational mode and a duration of the sleep mode with the microcontroller.

4. The method as claimed in claim 3 comprises the steps of:
   providing a low-power threshold stored on the microcontroller;
   monitoring a power level of the power source with the microcontroller; and
   lengthening the duration of the sleep mode with the microcontroller, if the power level is less than or equal to the low-power threshold.

5. The method as claimed in claim 3, wherein the normal rate of operating the low-power transceiver and the location-tracking device is within a microampere range.

6. The method as claimed in claim 3, wherein the power-saving rate of operating the low-power transceiver and the location-tracking device is within a nanoampere range.

7. The method as claimed in claim 1 comprises the steps of:
   receiving, via the owner account, a standby command with the corresponding PC device;
   relaying the standby command from the corresponding PC device, through the remote server, through the communication node, and to the electronic ear tag, if the standby command is entered by the owner account; and
   disabling transmission by the low-power transceiver in accordance to the standby command with the microcontroller.

8. The method as claimed in claim 7 comprises the steps of:
   receiving, via the owner account, a wake-up command with the corresponding PC device;
   relaying the wake-up command from the corresponding PC device, through the remote server, through the communication node, and to the electronic ear tag, if the wake-up command is entered by the owner account; and
   enabling transmission by the low-power transceiver in accordance to the wake-up command with the microcontroller.

9. The method as claimed in claim 1 comprises the steps of:
   activating, via the owner account, high-power mode with the corresponding PC device, wherein the high-power mode is associated to an elevated transmission rate;
   relaying an activation request for the high-power mode from the corresponding PC device, through the remote server, through the communication node, and to the electronic ear tag, if the high-power mode is activated by the owner account;
   setting the low-power transceiver into the high-power mode with the microcontroller; and
   periodically transmitting the spatial-positioning data at the elevated transmission rate with the low-power transceiver during step (E).

10. The method as claimed in claim 1 comprises the steps of:
    providing a visual indicator with the electronic ear tag, wherein the visual indicator is electronically connected to the microcontroller;

prompting the owner account to enter a live tracking command with the corresponding PC device;
relaying the live tracking command from the corresponding PC device, through the remote server, through the communication node, and to the electronic ear tag, if the live tracking command is entered by the owner account; and
activating the visual indicator in accordance to the live tracking command with the microcontroller.

11. The method as claimed in claim 10 comprises the steps of:
prompting the owner account to enter a tracking termination command with the corresponding PC device;
relaying the tracking termination command from the corresponding PC device, through the remote server, through the communication node, and to the electronic ear tag, if the tracking termination command is entered by the owner account; and
deactivating the visual indicator in accordance to the tracking termination command with the microcontroller.

12. The method as claimed in claim 1 comprises the steps of:
providing an onboard memory module with the electronic ear tag, wherein the onboard memory module is electronically connected to the microcontroller;
detecting a loss-of-transmission event with the microcontroller during step (D), if the electronic ear tag is not in communication with the communication node;
compiling the spatial-positioning data into an archive file for the loss-of-transmission event with the microcontroller;
detecting a transmission-recovery event with the microcontroller, if the electronic ear tag is in communication with the communication node; and
relaying the archive file for the loss-of-transmission event from the low-power transceiver to the low-power gateway, if the transmission-recovery event is detected by the microcontroller.

13. The method as claimed in claim 1, wherein the location tracking device is a Global Positioning System (GPS) transceiver.

14. The method as claimed in claim 1 comprises the steps of:
prompting the owner account to define a geo-fenced location for the electronic ear tag through the corresponding PC device;
relaying the geo-fenced location from the corresponding PC device of the owner account to the remote server;
comparing the spatial-positioning data to the geo-fenced location with the remote server in order to identify the electronic ear tag as being inside or outside the geo-fenced location; and
sending a warning notification to the corresponding PC device of the owner account, if the electronic ear tag is identified as being outside of the geo-fenced location by the remote server.

15. The method as claimed in claim 1 comprises the steps of:
providing an anti-theft module with the electronic ear tag;
detecting a tag-removal event with the anti-theft module;
relaying the tag-removal event from the low-power transceiver, through the communication node, and to the remote server; and
sending an alarm notification to the corresponding PC device of the owner account, wherein the alarm notification is associated to the tag-removal event.

16. The method as claimed in claim 1 comprises the step of:
communicably coupling the corresponding PC device of the owner account to the remote server through the communication node, if the corresponding PC device of the owner account is in communication range of the communication node.

17. The method as claimed in claim 1, wherein the communication node is a network node within a cellular network.

18. The method as claimed in claim 1, wherein the communication node is a network node within a local area network.

19. The method as claimed in claim 1, wherein the communication node is a network node within a satellite network.

20. The method as claimed in claim 1 comprises the steps of:
providing the at least one electronic ear tag as a plurality of electronic ear tags, wherein a male identifier or a female identifier for each electronic ear tag of the plurality of electronic ear tags is stored on the remote server, and wherein a mating distance threshold is stored on the remote server;
comparing the spatial-positioning data for said each electronic ear tag amongst each other with the remote server after step (F) in order to identify the at least one first tag within the mating distance threshold of at least one second tag, wherein the first tag and the second tag are from the plurality of electronic ear tags;
logging a mating-initiation entry between the first tag and the second tag with the remote server, if the first tag is designated with the male identifier and the second tag is designated with the female identifier, or if the first tag is designated with the female identifier and the second tag is designated with the male identifier;
relaying the mating-initiation entry from the remote server to the corresponding PC device of the owner account; and
displaying the mating-initiation entry with the corresponding PC device of the owner account.

21. The method as claimed in claim 1 comprises the steps of:
providing the at least one electronic ear tag as a plurality of electronic ear tags, wherein a male identifier or a female identifier for each electronic ear tag of the plurality of electronic ear tags is stored on the remote server; and
visually incorporating the male identifier or the female identifier for each electronic ear tag of the plurality of electronic ear tags into the graphical representation of the spatial positioning data with the remote server during step (G).

* * * * *